Sept. 4, 1945.  H. J. KENT  2,384,177
SELF-LOCKING SCREW AND NUT
Filed Dec. 20, 1943  2 Sheets-Sheet 1

INVENTOR
H J Kent
by E N Featherstonhaugh Atty

Sept. 4, 1945.   H. J. KENT   2,384,177
SELF-LOCKING SCREW AND NUT
Filed Dec. 20, 1943   2 Sheets-Sheet 2
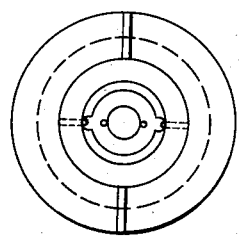
FIG 8
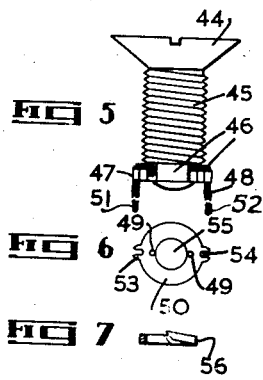
FIG 5
FIG 6
FIG 7
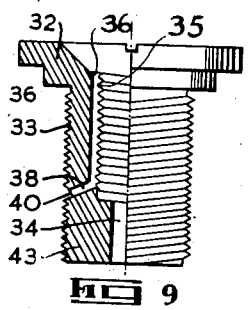
FIG 9
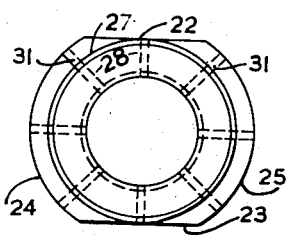
FIG 10
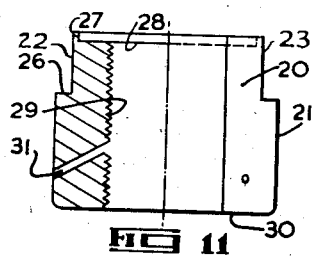
FIG 11
INVENTOR
H. J. Kent
by E. N. Fetherstonhaugh
ATTY.

Patented Sept. 4, 1945

2,384,177

UNITED STATES PATENT OFFICE 2,384,177

SELF-LOCKING SCREW AND NUT

Henry John Kent, Toronto, Ontario, Canada

Application December 20, 1943, Serial No. 515,059
In Canada January 10, 1944

10 Claims. (Cl. 151—5)

The invention relates to a self-locking screw and nut, as described in the present specification and illustrated in the accompanying drawings that form a part of the same.

The invention consists essentially of the novel features of construction as pointed out broadly and specifically in the claims for novelty following a description containing an explanation in detail of acceptable forms of the invention.

The objects of the invention are to provide a self-locking screw and nut which may be made in any size and which may have thereon and therein any type of thread; to furnish a self-locking screw and nut which may be made in metal cheaply and quickly by ordinary machine shop methods without appreciable increase in production costs and when using any type of soft or hard materials; to provide a self-locking screw and nut which may also be made from any of the standard plastic materials or glass; to provide a self-locking screw and nut in which not only the over-all size of the screw and the internal diameter of the nut may be varied but, also the locking members and locking plate and the lock washer may be varied in diameter and length and thickness; to furnish a self-locking screw and nut which has particular application to jigs and fixtures of all types including special test fixtures and similar devices subject to abnormal vibration; to provide a self-locking screw and nut which may be used to secure covers on cases, show-cases, inspection covers, machine guards and the like; and generally to provide a self-locking screw and nut which may be used in any place where quick assembly and quick release of secured parts of variable thickness is desired, the nut member being permanently secured in position thus providing a simple and efficient fastening unit in which the secured nut member may be used repeatedly irrespective of the number of replacements of the screw member.

In the drawings:

Figure 5 is a detailed elevational view of the inner screw member having the locking members and locking plate lightly riveted to the lower part.

Figure 6 is a plan view of the lock plate.

Figure 7 is a partly sectional and partly elevational view of the lock washer.

Figure 8 is a plan view of the outer screw member showing the lock plate in situ.

Figure 9 is a partly elevational and partly vertical sectional view of Figure 8.

Figure 10 is a plan view of the nut member.

Figure 11 is a partly elevational and partly sectional view of the nut member, having the upper flange in its original position.

Like numerals of reference indicate corresponding parts in the various figures.

Figure 1:
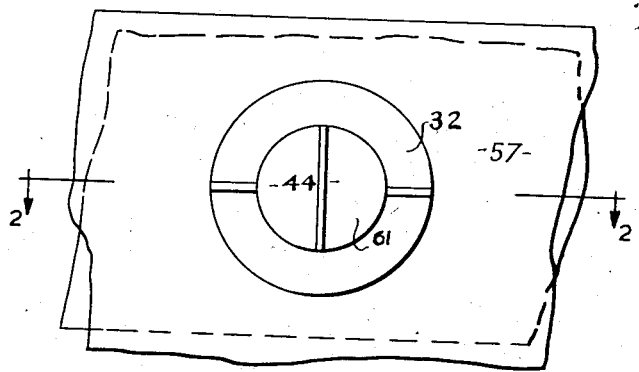
Figure 1 is a plan view of the fastener unit securing two members.

Referring to the drawings:

The nut member 20 consists of a cylindrical body 21 having two flat shallow machined faces 22 and 23 in the upper portion of the body of the member 20. The length of the nut 20 is variable and depends on the thickness of material to be secured. The purpose of the machined faces 22 and 23 is to prevent the nut from turning round during the operation of securing by screwing.

The lower periphery of the segments 24 and 25 is curved. Around the upper periphery of the nut 20 is the shallow shoulder 26 ending in a circular flange 27, the top surface of the nut member 20 being represented by the numeral 28.

The nut member 20 is internally bored and threaded, the threads being represented by the numeral 29. Close to the bottom surface 30 of the nut 20 are a series of equidistantly spaced bored holes 31, the axis of the holes making an angle of approximately 45 degrees to the axis of the nut 20.

Figures 2, 3:
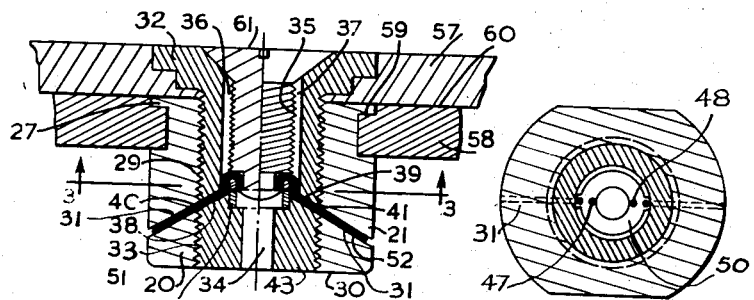
Figure 2 is a vertical sectional view on the line 2—2 in Figure 1.
Figure 3 is a sectional view on the line 3—3 in Figure 2.
Figure 4:
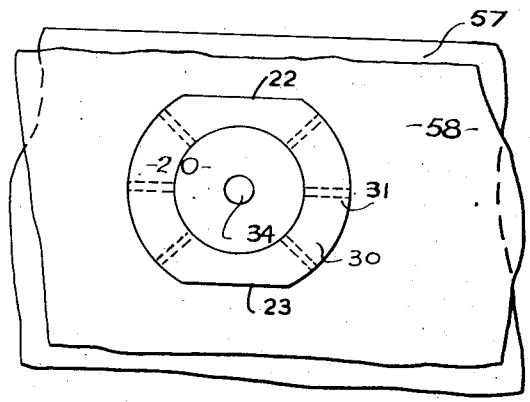
Figure 4 is a bottom plan view of Figure 2.

Referring more particularly to Figure 2, it will be seen that the threaded bore 29 of the nut member 20, has secured therein the outer screw member 32 having the external threads 33 adapted to engage with the internal threads 29 of the nut member 20.

The outer screw member 32 has a longitudinal bored portion 34 and an upper counterbored and internally threaded portion 35. At diametrically opposite points, the outer screw member 32 has two vertical channels 36 and 37, of predetermined cross sectional shape and length, terminating in apertures 38 and 39, the axis of the apertures 38 and 39 being at 45 degrees to the central axis of the screw member 32.

The orifices 40 and 41 of the apertures 38 and 39, on the outer threaded portion 33 of the outer screw member 32, are located at such a vertical distance from the lower surface 43 of the screw 32 that, when the screw 32 is secured within the nut member 20, the orifices 40 and 41 are in alignment with any two diametrically opposite corresponding equidistantly spaced and bored holes 31 in the nut member 20.

The internal screw member 44 has a threaded shank 45 terminating in the boss member 46 and, before insertion of the inner screw into the threaded portion 35 of the outer screw 32, the locking members 47 and 48, which may consist of suitable outwardly pressing spring wires having tapered or suitably shaped extremities, are threaded at their upper ends through apertures 49 in the lock plate 50 with their longer ends 51 and 52 projecting downwardly and pressed against the semi-circular flanges 53 and 54 in the lock plate 50.

The lock plate 50 has an inner bored aperture 55 of a diameter slightly larger than the boss member 46 on the internal screw member 44 over-which the lock plate 50 fits; the thickness of the lock plate being variable. Beneath the lock plate 50 is placed a standard circular spring-lock washer 56.

The complete assembly of the parts referred to in detail in the foregoing is illustrated in Figure 2.

Assuming that two members 57 and 58 are to be secured by means of the unit, the first step consists of securing the nut member 20 to the member 58. To do this, the member 58 is first punched the aperture having two flat sides and two segmented portions corresponding with those on the nut 20.

At the same time as this operation is performed on the member 58, a circular counter-sunk area 59 is punched on the outer side 60 of the member 58. The nut member 20 is then inserted into the aperture and the upper flange member 27 being then turned down into its final position as shown in Figure 2.

Thus the member 58 and the nut member 20 are firmly secured and, since the nut member 20 has the flat sides 22 and 23, it is impossible for the nut member to turn when the securing members 32 and 44 are secured internally.

The member 57, having a suitable aperture to permit insertion of the members 32 and 44, is then placed in contiguous relationship with the member 58. The member 32 is then secured in place by screwing the threaded portion 33 thereof into the correspondingly threaded portion 29 of the nut member 20.

The lock washer 56 is now placed in the lower part of the internally bored and threaded portion 35 of the member 32. The next step is to secure the lock plate 50 and the locking wires 47 and 48 round the base of the boss member 46 of the internal screwing member 44.

In securing the members 50 and 51, as has already been pointed out, the locking wires 47 and 48 are bent into a U-shape through the apertures 49 and over the face of the lock plate itself, and project downwardly with their inner surfaces in contact with the semi-circular portions of the members 53 and 54.

The assembled spring locking wires 47 and 48 and the lock plate 50, in this position, are then secured round the boss member 46 which is then lightly riveted so as to permit relative movement between the members 50 and 47 and 48 and the member 44.

The member 44 is then inserted into the internally threaded portion 35 of the member 32, the spring-pressed locking wires 47 and 48 being pushed down the aforementioned slots 36 and 37.

It will be obvious that, since relative rotation is possible between the members 44, 50, and 47 and 48, the locking wires 47 and 48 must travel down to the bottom of the slots 36 and 37 at the same time that the internal screwing member 44 is firmly screwed down the threaded aperture 35.

When the top surface 61 of the internal screwing member 44 is flush with the outer member 57, the locking wires 47 and 48, being diametrically opposite each other, must necessarily pass down the aperture 38 in the member 32 and down any two diametrically opposite aligned apertures 31 in the nut member 20, leaving the extremities 51 and 52 flush with the outer periphery of the nut member 20.

It will be understood that the removal of the member 44 by unscrewing from the aperture 35 will result in the withdrawal of the locking wires 47 and 48 together with the lock plate 50.

It will be obvious that various changes and modifications may be made to the disclosed structure without departing from the spirit and scope of this invention as defined by the appended claims.

What I claim is:

1. As a new article of manufacture, a self-locking fastener comprising a nut member in association with a plurality of screw members adapted to be secured to the said nut member, the said plurality of screw members being adapted to be secured internally of the said nut member and having their respective longitudinal axes parallel to that of the said nut member, and the said plurality of internally securable axially aligned screw members preferably comprising a larger diametered outer screwing member having a central lower bored aperture of small diameter with a wider counter-bored and threaded aperture, and having a plurality of vertical slots therein disposed above the said lower smaller diametered aperture, the said upper counter-bored and threaded aperture having an upper counter-sunk periphery adapted to seat the head of a second smaller diametered screw member.

2. As a new article of manufacture, a self-locking fastener comprising a nut member in association with a plurality of screw members adapted to be secured to the said nut member, the said plurality of screw members being adapted to be secured internally of the said nut member, and having their respective longitudinal axes parallel to that of the said nut member, and the said plurality of internally securable axially aligned screw members preferably comprising a larger diametered outer screwing member having a central lower bored aperture of small diameter with a wider counter-bored and threaded aperture, and having a plurality of vertical slots therein disposed above the said lower smaller diametered aperture, the said upper counter-bored and threaded aperture having an upper counter-sunk periphery adapted to seat the head of a second smaller diametered screw member, the said second smaller diametered screw member adapted to be secured within the said outer larger diameter screwing member.

3. As a new article of manufacture, a self-locking fastener comprising a nut member in association with a plurality of screw members adapted to be secured to the said nut member, the said plurality of screw members being adapted to be secured internally of the said nut member and having their respective longitudinal axes parallel to that of the said nut member, and the said plurality of internally securable axially aligned screw members preferably comprising a larger diametered outer screwing member having a central lower bored aperture of small diameter with a wider counterbored and threaded aperture, and having a plurality of vertical slots therein disposed above the said lower smaller diametered aperture, the said upper counterbored and threaded aperture having an upper counter-sunk periphery adapted to seat the head of a second smaller diametered screw member, the said second smaller diametered screw member adapted to be secured within the said outer larger diameter screwing member, and having an upper head portion and a threaded shank portion terminating at the lower extremity thereof in a cylindrical boss member, the said boss member being axially aligned with the said threaded shank portion.

4. As a new article of manufacture, a self-locking fastener comprising a nut member in association with a plurality of screw members adapted to be secured to the said nut member, the said plurality of screw members being adapted to be secured internally of the said nut member and having their respective longitudinal axes parallel to that of the said nut member, and the said plurality of internally securable axially aligned screw members preferably comprising a larger diametered outer screwing member having a central lower bored aperture of small diameter with a wider counter-bored and threaded aperture, and having a plurality of vertical slots therein disposed above the said lower smaller diametered aperture, the said upper counter-bored and threaded aperture having an upper countersunk periphery adapted to seat the head of a second smaller diametered screw member, the said second smaller diametered screw member adapted to be secured within the said outer larger diametered screwing member, and having an upper head portion and a threaded shank portion terminating at the lower extremity thereof in a cylindrical boss member, the said boss member being axially aligned with the said threaded shank portion, the said boss member of the said smaller diametered inner screwing member being of a predetermined diameter smaller than that of the said threaded shank portion thereof, and being adapted to having a locking plate secured thereon.

5. As a new article of manufacture, a self-locking fastener comprising a nut member in association with a plurality of screw members adapted to be secured to the said nut member, the said plurality of screw members being adapted to be secured internally of the said nut member and having their respective longitudinal axes parallel to that of the said nut member, and the said plurality of internally securably axially aligned screw members preferably comprising a larger diametered outer screwing member having a central lower bored aperture of small diameter with a wider counter-bored and threaded aperture, and having a plurality of vertical slots therein disposed above the said lower smaller diametered aperture, the said upper counter-bored and threaded aperture having an upper counter-sunk periphery adapted to seat the head of a second smaller diametered screw member, the said second smaller diametered screw member adapted to be secured within the said outer larger diameter screwing member, and having an upper head portion and a threaded shank portion terminating at the lower extremity thereof in a cylindrical boss member, the said boss member being axially aligned with the said threaded shank portion, the said boss member of the said smaller diametered inner screwing member being of a predetermined diameter smaller than that of the said threaded shank portion thereof, and being adapted to having a locking plate secured thereon, the said locking plate member comprising flat annular member having a plurality of diametrically located projections on the outer periphery thereof, the said projections being formed of upper and lower oppositely spaced segmental portions, the said upper and lower segmental portions of the said plurality of diametrically located projections enclosing an inner arcuate cavity and the inner diameter of the said annular member being slightly larger than the diameter of the said boss member.

6. As a new article of manufacture, a self-locking fastener comprising a nut member in association with a plurality of screw members adapted to be secured to the said nut member, the said plurality of screw members being adapted to be secured internally of the said nut member and having their respective longitudinal axes parallel to that of the said nut member, and the said plurality of internally securably axially aligned screw members preferably comprising a larger diametered outer screwing member having a central lower bored aperture of small diameter with a wider counter-bored and threaded aperture, and having a plurality of vertical slots therein disposed above the said lower smaller diametered aperture, the said upper counter-bored and threaded aperture having an upper counter-sunk periphery adapted to seat the head of a second smaller diametered screw member, the said second small diametered screw member adapted to be secured within the said outer larger diameter screwing member, and having an upper head portion and a threaded shank portion terminating at the lower extremity thereof in a cylindrical boss member, the said boss member being axially aligned with the said threaded shank portion, the said boss member of the said smaller diametered inner screwing member being of a predetermined diameter smaller than that of the said threaded shank portion thereof, and being adapted to having a locking plate secured thereon, the said locking plate member comprising a flat annular member having a plurality of diametrically located projections on the outer periphery thereof, the said projections being formed of upper and lower oppositely spaced segmental portions, the said upper and lower segmental portions of the said plurality of diametrically located projections enclosing an inner arcuate cavity and the inner diameter of the said annular member being slightly larger than the diameter of the said boss member, the said annular locking plate member having located in diametrical alignment with the said plurality of arcuate cavities, a plurality of apertures therethrough, the vertical axis of the said apertures being parallel to the vertical axis of the inner circular aperture of the said annular member.

7. As a new article of manufacture, a self-locking fastener comprising a nut member in association with a plurality of screw members adapted to be secured to said nut member, the said plurality of screw members being adapted to be secured internally of the said nut member and having their respective longitudinal axes parallel to that of the said nut member, and the said plurality of internally securably axially aligned screw members preferably comprising a larger diametered outer screwing member having a central lower bored aperture of small diameter with a wider counter-bored and threaded aperture, and having a plurality of vertical slots therein disposed above the said lower smaller diametered aperture, the said upper counter-bored and threaded aperture having an upper counter-sunk periphery adapted to seat the head of a second smaller diametered screw member, the said smaller diametered screw member adapted to be secured within the said outer larger diameter screwing member, and having an upper head portion and a threaded shank portion terminating at the lower extremity thereof in a cylindrical boss member, the said boss member being axially aligned with the said threaded shank portion, the said boss member of the said smaller diametered inner screwing member being of a predetermined diameter smaller than that of the said threaded shank portion thereof and being adapted to having a locking plate secured thereon, the said locking plate member comprising a flat annular member having a plurality of diametrically located projections on the outer periphery thereof, the said projections being formed of upper and lower oppositely spaced segmental portions, the said upper and lower segmental portions of the said plurality of diametrically located projections enclosing an inner arcuate cavity and the inner diameter of the said annular member being slightly larger than the diameter of the said boss member, the said annular locking plate member having located in diametrical alignment with the said plurality of arcuate cavities, a plurality of apertures therethrough, the vertical axis of the said apertures being parallel to the vertical axis of the inner circular aperture of the said annular member, the said plurality of apertures in the said locking plate member and the said like plurality of arcuate cavities, located in predetermined positions on the exterior periphery of the annular member, being adapted to secure a like plurality of diametrically disposed extruded locking members.

8. As a new article of manufacture, a self-locking fastener comprising a nut member in association with a plurality of screw members adapted to be secured to the said nut member, the said plurality of screw members being adapted to be secured internallly of the said nut member and having their respective longitudinal axes parallel to that of the said nut member, and the said plurality of internally securable axially aligned screw members preferably comprising a larger diametered outer screwing member having a central lower bored aperture of small diameter with a wider counter-bored and threaded aperture, and having a plurality of vertical slots therein disposed above the said lower smaller diametered aperture, the said upper counter-bored and threaded aperture having an upper counter-sunk periphery adapted to seat the head of a second smaller diametered screw member, the said smaller diametered screw member adapted to be secured within the said outer larger diameter screwing member, and having an upper head portion and a threaded shank portion terminating at the lower extremity thereof in a cylindrical boss member, the said boss member being axially aligned with the said threaded shank portion, the said boss member of the said smaller diametered inner screwing member being of a predetermined diameter smaller than that of the said threaded shank portion thereof, and being adapted to having a locking plate secured thereon, the said locking plate member comprising a flat annular member having a plurality of diametrically located projections on the outer periphery thereof, the said projections being formed of upper and lower oppositely spaced segmental portions, the said upper and lower segmental portions of the said plurality of diametrically located projections enclosing an inner arcuate cavity, and the inner diameter of the said annular member being slightly larger than the diameter of the said boss member, the said annular locking plate member having located in diametrical alignment with the said plurality of arcuate cavities, a plurality of apertures therethrough, the vertical axis of the said apertures being parallel to the vertical axis of the inner circular aperture of the said annular member, the said plurality of apertures in the said locking plate member and the said like plurality of arcuate cavities, located in predetermined positions on the exterior periphery of the annular member, being adapted to secure a like plurality of diametrically disposed extruded locking members, the said plurality of extended locking members having shorter upper extremities threaded through the said like plurality of diametrically disposed apertures located in the said annular locking plate member and also through the proximate member of the said like plurality of arcuate cavities, the lower exterior extremities of the said extended locking members being of a predetermined shape and length.

9. As a new article of manufacture, a self-locking fastener comprising a nut member in association with a plurality of screw members adapted to be secured to the said nut member, the said plurality of screw members being adapted to be secured internally of the said nut member and having their respective longitudinal axes parallel to that of the said nut member, and the said plurality of internally securable axially aligned screw members preferably comprising a larger diametered outer screwing member having a central lower bored aperture of small diameter with a wider counterbored and threaded aperture, and having a plurality of vertical slots therein disposed above the said lower smaller diametered aperture, the said upper counter-bored and threaded aperture having an upper counter-sunk periphery adapted to seat the head of a second smaller diametered screw member, the said smaller diametered screw member adapted to be secured within the said outer larger diameter screwing member, and having an upper head portion and a threaded shank portion terminating at the lower extremity thereof in a cylindrical boss member, the said boss member being axially aligned with the said threaded shank portion, the said boss member of the said smaller diametered inner screwing member being of a predetermined diameter smaller than that of the said threaded shank portion thereof, and being adapted to having a locking plate secured thereon, the said locking plate member comprising a flat annular member having a plurality of diametrically located projections on the outer periphery thereof, the said projections being formed of upper and lower oppositely spaced segmental portions, the said upper and lower segmental portions of the said plurality of diametrically located projections enclosing an inner arcuate cavity, and the inner diameter of the said annular member being slightly larger than the diameter of the said boss member, the said annular locking plate member having located in diametrical alignment with the said plurality of arcuate cavities, a plurality of apertures therethrough, the vertical axis of the said apertures being parallel to the vertical axis of the inner circular aperture of the said annular member, the said plurality of apertures in the said locking plate member and the said like plurality of arcuate cavities, located in predetermined positions on the exterior periphery of the annular member, being adapted to secure a like plurality of diametrically disposed extruded locking members, the said plurality of extended locking members having shorter upper extremities threaded through the said like plurality of diametrically disposed apertures located in the said annular locking plate member and also through the proximate member of the said like plurality of arcuate cavities, the lower exterior extremities of the said extended locking members being of a predetermined shape and length, the said larger diametered outer screwing member having disposed downwardly therein a plurality of of apertures, the longitudinal axis of the said plurality of apertures being disposed at a predetermined angle to the longitudinal axis of the said nut member, and the said nut member having therein a like plurality of similar apertures of which the axis are disposed at the identical predetermined angle to the longitudinal axis of the nut.

10. As a new article of manufacture, a self-locking fastener comprising a nut member in association with a plurality of screw members adapted to be secured to the said nut member, the said plurality of screw members being adapted to be secured internally of the said nut member and having their respective longitudinal axes parallel to that of the said nut member, and the said plurality of internally securable axially aligned screw members preferably comprising a larger diametered outer screwing member having a central lower bored aperture of small diameter with a wider counter-bored and threaded aperture, and having a plurality of vertical slots therein disposed above the said lower smaller diametered aperture, the said upper counter-bored and threaded aperture having an upper counter-sunk periphery adapted to seat the head of a second smaller diametered screw member, the said smaller diametered screw member adapted to be secured within the said outer larger diameter screwing member, and having an upper head portion and a threaded shank portion terminating at the lower extremity thereof in a cylindrical boss member, the said boss member being axially aligned with the said threaded shank portion, the said boss member of the said smaller diametered inner screwing member being of a predetermined diameter smaller than that of the said threaded shank portion thereof, and being adapted to having a locking plate secured thereon, the said locking plate member comprising a flat annular member having a plurality of diametrically located projections on the outer periphery thereof, the said projections being formed of upper and lower oppositely spaced segmental portions, the said upper and lower segmental portions of the said plurality of diametrically located projections enclosing an inner arcuate cavity, and the inner diameter of the said annular member being slightly larger than the diameter of the said boss member, the said annular locking plate member having located in diametrical alignment with the said plurality of arcuate cavities, a plurality of apertures therethrough, the vertical axis of the said apertures being parallel to the vertical axis of the inner circular aperture of the said annular member, the said plurality of apertures in the said locking plate member and the said like plurality of arcuate cavities, located in predetermined positions on the exterior periphery of the annular member, being adapted to secure a like plurality of diametrically disposed extruded locking members, the said plurality of extended locking members having shorter upper extremities threaded through the said like plurality of diametrically disposed apertures located in the said annular locking plate member and also through the proximate member of the said like plurality of arcuate cavities, the lower exterior extremities of the said extended locking members being of a predetermined shape and length, the said larger diametered outer screwing member having disposed downwardly therein a plurality of apertures, the longitudinal axis of the said plurality of apertures being disposed at a predetermined angle to the longitudinal axis of the said nut member, and the said nut member having therein a like plurality of similar apertures of which the axis are disposed at the identical predetermined angle to the longitudinal axis of the nut, the said extended locking members being adapted to be secured in place by means of the said vertical slots in the said outer screwing member and being finally located in locking position in the said apertures in the said outer screwing member and, simultaneously, in the corresponding identically inclined apertures in the said nut member.

HENRY JOHN KENT.